United States Patent [19]

Akins

[11] Patent Number: 5,111,773

[45] Date of Patent: May 12, 1992

[54] SQUEEZE CHUTE

[76] Inventor: Edward A. Akins, Box 158, St. Boniface, Winnipeg, Manitoba, Canada, R2H 3B4

[21] Appl. No.: 626,454

[22] Filed: Dec. 12, 1990

[51] Int. Cl.$^5$ .................. A01K 1/06; A01K 1/015
[52] U.S. Cl. ................................ 119/99; 119/28
[58] Field of Search ............... 119/99, 98, 96, 147, 119/28, 82, 100, 101, 102, 103

[56] References Cited

U.S. PATENT DOCUMENTS

| | | | |
|---|---|---|---|
| 2,508,549 | 5/1950 | Stephenson | 119/99 |
| 2,564,317 | 8/1951 | Whitworth | 119/99 |
| 2,593,559 | 4/1952 | Heldenbrand | 119/99 |
| 2,730,072 | 1/1956 | Firkins | 119/99 |
| 3,099,249 | 7/1963 | Newhouse | 119/99 |
| 3,699,926 | 10/1972 | Stockl | 119/28 |
| 3,777,715 | 12/1973 | Hill et al. | 119/99 |
| 3,814,060 | 6/1974 | Swenson | 119/98 |
| 4,027,029 | 6/1977 | Pearson | 119/99 |
| 4,302,908 | 12/1981 | Parker | 119/98 |
| 4,362,128 | 12/1982 | Downey | 119/28 |

FOREIGN PATENT DOCUMENTS

216699 8/1958 Australia ................ 119/99

Primary Examiner—John G. Weiss
Attorney, Agent, or Firm—Adrian D. Battison; Stanley G. Ade; Murray E. Thrift

[57] ABSTRACT

A squeeze chute includes a head gate section, a squeeze side panel, a floor and a tailgate assembly. A quick adjust arrangement is provided for the headgate in which one bar of the headgate door can be moved vertically to release latches for the outermost vertical bar of the door. The squeeze panel is improved by the provision of drop bars having a cap member which can be simply released by pulling downwardly from a channel defining the upper rail of the panel. Drop boards are provided in the panel and have rails projecting into channels at either end of the panel so that the boards can be lifted and folded simply by removal of the ends from the channel. The floor includes a horizontal sheet on which are attached transverse stiffeners with a resilient layer cast over the sheet and the stiffeners for attraction by the animal. The tailgate assembly can be operated by a foot pedal and by levers. The squeeze panel arrangement can be pivoted by a lever assembly which operates in one direction to pivot the squeeze panel and in the opposite direction to lift the squeeze panel for adjustment of the position of the lower edge of the panel on the floor of the chute.

23 Claims, 8 Drawing Sheets

SQUEEZE CHUTE

BACKGROUND OF THE INVENTION

This invention relates to a squeeze chute for confinement of animals.

Squeeze chutes are well known and conventionally include a generally channel shaped frame structure having a head end for receiving a head of an animal to be confined, two sides each for extending along a respective side of the animal to be confined, a tail end remote from the head end. A head gate assembly at the head end is operable to move from a release position to a closed position in which the neck of the animal is grasped for confinement of the animal. A squeeze side panel is arranged along one side and is operable in a pivoting action to squeeze the animal from one side onto the other side panel so that the body of the animal is also confined. A tail gate section is often provided at the rear end to close behind the animal as it enters the squeeze chute.

Various designs of head gate are used including a design having two swing doors which can pivot from a first position facing inwardly into the chute to a closed position in which both the doors lie in a plane across the front face of the chute to an open or release position pivoted forwardly out of the chute to allow the animal to escape. It is generally necessary in such designs to adjust the spacing between the inner most vertical bars of the doors so that the squeezing action between the bars can be varied in dependance upon the width of the neck of the animal concerned.

The side panels generally include three horizontal rails at spaced positions in the height of the panel. Between the upper two rails are provided vertical bars otherwise known as drop tubes which can be detached from the upper rail and pivoted relative to the middle rail to allow access to the animal. In addition for some operations the lower part of the panel is defined by horizontal boards which can be opened or removed as required to allow access to the animal.

SUMMARY OF THE INVENTION

It is one object of the present invention, therefore, to provide an improved design for the drop bars of the side panel of a squeeze chute.

According to the invention, therefore, there is provided an animal confinement apparatus comprising a generally channel shaped frame structure having a head end for receiving a head of an animal to be confined, two sides each for extending along a respective side of the animal to be confined, a tail end remote from the head end, a head gate assembly at the head end operable to move from a release position to a closed position in which the neck of the animal is grasped for confinement thereof, a squeeze side panel, said panel being operable to move from an initial outward position inwardly toward the opposed side to squeeze the animal to be confined, the squeeze side panel comprising a substantially planar panel having a plurality of horizontal rail members, a plurality of parallel drop bars on one horizontal member so as to extend to an adjacent horizontal rail member, each of the drop bars having one end mounted on said one horizontal rail member for pivotal movement relative thereto from a closed position in which an opposed end is attached to the adjacent horizontal rail member to an open position in which the opposed end is free to be pivoted out of the plane of the panel to expose the confined animal, each drop bar comprising a main bar part extending from said one rail member to a free end adjacent said adjacent rail member, a cap part mounted on the free end and slidable longitudinally thereof relative to the main part and spring means biasing the cap part outwardly from the main part, said adjacent rail member including receptacle means for receiving the cap part and shaped to release the cap part on movement of the cap part against said spring bias.

It is a second object of the present invention to provide an improved design of drop board and support therefor.

According to the invention, therefore, there is provided an animal confinement apparatus comprising a generally channel shaped frame structure having a head end, a head gate assembly at the head end operable to move from a release position to a closed position in which the neck of the animal is grasped for confinement thereof, a squeeze side panel, an opposed side panel said squeeze side panel being operable to move from an initial outward position inwardly toward the opposed side panel to squeeze the animal to be confined, at least one of said side panels comprising substantially planar panel having a plurality of horizontal rail members and a pair of drop boards mounted in co-planar edge to edge relationship between one rail member and the next adjacent rail member, the drop boards being coupled for hinged movement about a hinge line parallel to and between the boards, each of the drop boards having an upper rail and a lower rail, the upper rail of an upper one of the boards, the lower rail of a lower one of the boards and one of the upper rail of the lower board and the lower rail of the upper board each having ends projecting outwardly beyond an end of the drop board, a pair of channel guide members mounted between said one rail member and a next adjaent rail member and each defining a web and two parallel flanges leaving an open channel slot facing inwardly toward the drop boards and arranged to receive and located the outwardly projecting ends of the rails, one of the flanges of each of the channel guide members having an opening therein shaped to allow release therethrough of the end of a rail, the opening being located at a height above a rest position of the rail when held in the channel guide member whereby the drop boards can be lifted and said end of the rail withdrawn from the channel guide member.

It is a further object of the present invention to provide an improved actuating system for the squeeze side panel.

According to the invention, therefore, there is provided an animal confinement apparatus comprising a generally channel shaped frame structure having a head end for receiving a head of an animal to be confined, two sides each for extending along a respective side of the animal to be confined, a tail end remote from the head end and a floor on which the animal to be confined stands and spanning the area between the sides, the head end and the tail end, a head gate assembly at the head end operable to move from a release position to a closed position in which the neck of the animal is grasped for confinement thereof, a squeeze side panel, actuating means operable to move the squeeze side panel from an initial outward position inwardly toward the opposed side to squeeze the animal to be confined, the squeeze side panel comprising a substantially planar panel having a plurality of horizontal rail members, the panel having a lower edge adjacent the floor, locating means defining a plurality of locations for the lower edge at spaced positions toward and away from the animal to accomodate smaller and larger animals respectively, said actuating means being arranged to pivot said panel about said lower edge while in one of said locations to squeeze said animal, said actuating means comprising lever means coupled to said panel at a location thereon spaced from the lower edge, a manually operable lever arranged to apply force to said lever means in a first direction to cause said pivoting about said panel about said lower edge, and to apply force in a second direction opposite to the first direction to lift the panel upwardly from the locating means to allow movement of the lower edge of the panel from one of said locations to another of said locations.

It is a further object of the present invention to provide an improved design of floor structure for a squeeze chute.

According to the invention, therefore, there is provided an animal confinement apparatus comprising a generally channel shaped frame structure having a head end for receiving a head of an animal to be confined, two sides each for extending along a respective side of the animal to be confined, a tail end remote from the head end and a floor on which the animal to be confined stands and spanning the area between the sides, the head end and the tail end, a head gate assembly at the head end operable to move from a release position to a closed position in which the neck of the animal is grasped for confinement thereof, a squeeze side panel, actuating means operable to move the squeeze side panel from an initial outward position inwardly toward the opposed side to squeeze the animal to be confined, the squeeze side panel comprising a substantially planar panel having a plurality of horizontal rail members, the floor comprising a metal sheet and a resilient coating applied over the upper surface of the sheet and the stiffener members.

It is a further object of the present invention to provide an improved system for adjustment of the spacing between the vertical bars of the head gate doors.

According to the invention, therefore, there is provided an animal confiment apparatus comprising a generally channel shaped frame structure having a head end for receiving a head of an animal to be confined, two sides each for extending along a respective side of the animal to be confined, a tail end remote from the head end, a head gate assembly at the head end operable to move from a release position to a closed position in which the neck of the animal is grasped for confinement thereof, a squeeze side panel, said panel being operable to move from an initial outward position inwardly toward the opposed side to squeeze the animal to be confined, the head gate assembly comprising a pair of headgate doors, each door having a first vertical post member for cooperating with the vertical post member of the other of the doors to trap the neck of the animal therebetween, support means mounting the post member on a hinge support member for pivotal movement of the door and particularly the vertical post member about a pivot axis generally parallel to the post member and located at a respective side of the chute such that the doors can move from a closed position in which the post members lie in a plane including the pivot axis to open positions on either side of the plane, and adjustment means mounting the post member on the support means for movement relative to the support means in a direction toward and away from the pivot axis to adjust the space between the post members in the closed position to accomodate different width necks of the animals, said adjustment means comprising first and second guide means at a top and bottom respectively of the door, first and a second adjustment plate attached at a top and bottom respectively of the post member, each of said adjustment plates being slideable toward and away from the pivot axis along a respective one of the guide means and including a plurality of spaced adjustment locations thereon, and first and second latch means mounted respectively adjacent the first and second guide means and movable vertically to engage and release the respective adjustment plate at a selected one of the adjustment locations thereon.

It is a further object of the present invention to provide an improved system for actuation of the tail gate assembly.

According to the invention, therefore, there is provided an animal confiment apparatus comprising a generally channel shaped frame structure having a head end for receiving a head of an animal to be confined, two sides each for extending along a respective side of the animal to be confined, a tail end remote from the head end, a head gate assembly at the head end operable to move from a release position to a closed position in which the neck of the animal is grasped for confinement thereof, a squeeze side panel, said panel being operable to move from an initial outward position inwardly toward the opposed side to squeeze the animal to be confined, a tail gate assembly, means for moving the tail gate assembly from an open position allowing an animal to pass forwardly into the frame structure for confinement to a closed position rearwardly of the confined animal, and manual actuating means for operating said moving means, said actuating means including a handle which can be pulled and pushed by hand and a foot pedal which can be pressed by the foot of the user.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
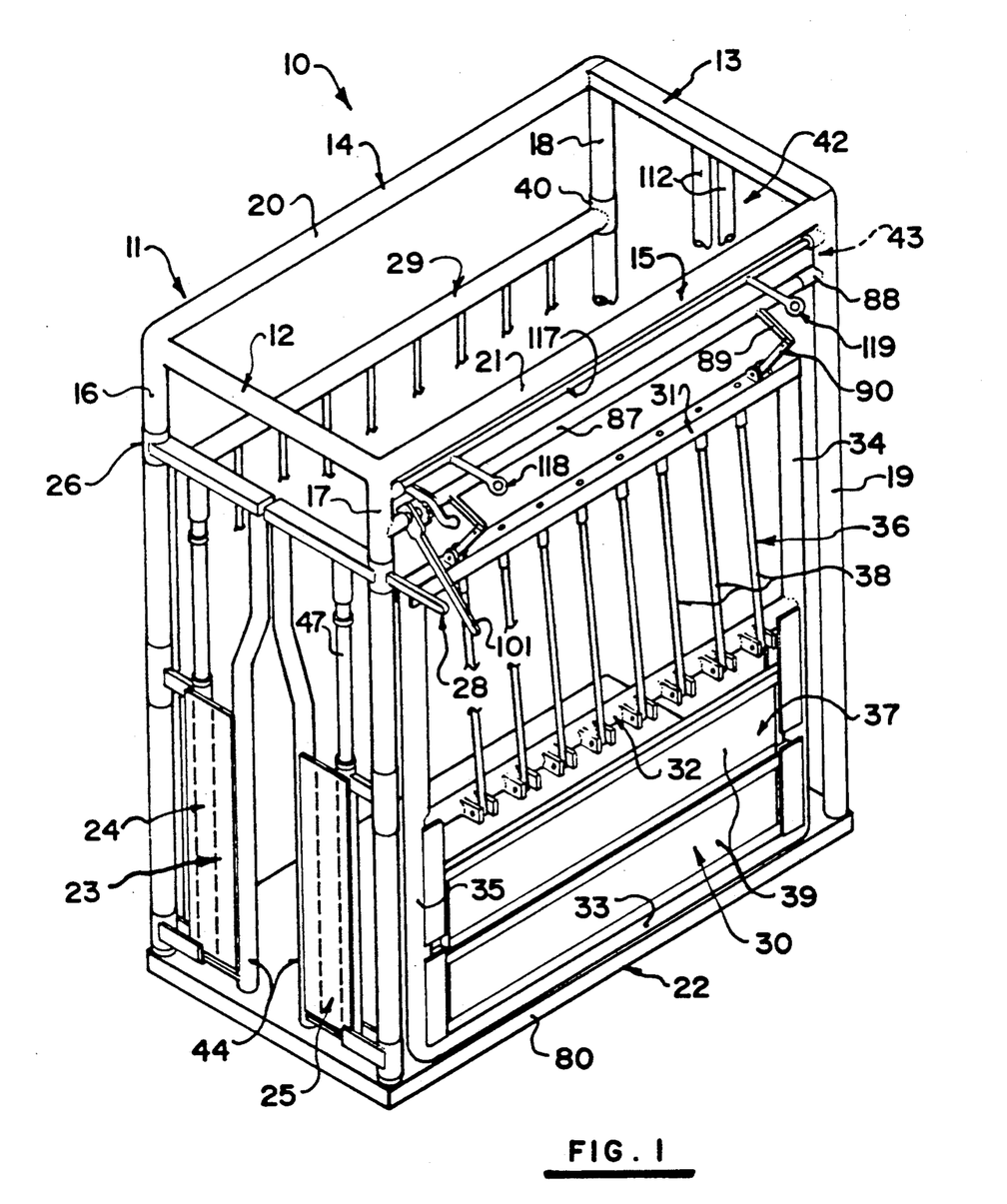
FIG. 1 is a schematic isometric view of a squeeze chute according to the present invention with many of the features shown only schematically for convenience of illustration.

A squeeze chute generally indicated at 10 is formed by a frame structure 11 forming a front panel 12, a rear panel 13, a first side 14 and a second side 15. Each of the panels is formed by vertical posts so that the front panel includes posts 16 and 17 and the rear panel includes posts 18 and 19. The front and rear panels are connected by horizontal rails 20 and 21 at the top part of the frame and by a floor structure 22 at the lower part of the frame thus forming a rigid channel shaped frame structure into which an animal to be confined can enter from the rear panel to a position between the side panels and rearwardly of the front panel.

The front panel includes a head gate assembly generally indicated at 23 including a first door 25 and a second door 24 each of which is pivotally mounted for opening and closing movement around a vertical axis from a closed or confinement position shown in FIG. 1 to a receiving position in which the doors are pivoted to face inwardly and to the chute so that the animal pushes its head between the doors as it tries to escape out of the front of the squeeze chute with the animal automatically pushing the doors to the closed confinement position as it engages the doors. The doors can then be pivoted to a release position facing outwardly of the front of the squeeze chute in which the animal can escape when the confinement is no longer required.

As shown the doors are mounted for pivotal movement around the vertical posts 16 and 17 on bushings 26 and 27. However as will be well known to one skilled in the art, alternative support arrangements for the doors may be provided as required. Suitable latching devices for the doors in the closed position will also be provided but are not shown herein for convenience of illustration and will be well known to one skilled in the art. In addition in many cases the cable control assembly is provided which ensures that the doors remain in synchronism so that if one door is pushed, both of the doors move into the required location. The doors can be manually operated by a lever 28 which projects outwardly from the post 17 toward the side 15 of the squeeze chute.

Each side 14 and 15 of the frame carries a side panel 29 and 30 which operates to confine the sides of the animal while its head is held by the head gate assembly. Each of the side panels includes an upper rail 31, a middle rail 32 and a bottom rail 33 with each of the rails being parallel and extending in a horizontal direction. At the ends of each side panel are provided a pair of vertical posts 34 and 35 thus defining a rectangular panel with an upper open area 36 and a lower open area 37. Between the middle rail 32 and the upper rail 31 spanning the upper open area 36 is provided a plurality of drop bars 38. Between the middle rail and the lower rail 33, spanning the lower open area 37 is provided a pair of drop boards 39. The details of the drop tubes and drop boards will be described hereinafter.

The side panel 29 is mounted for pivotal movement about a vertical axis defined by the post 18 on bushings one of which is visible at 40. The panel 29 can be latched in a closed position in which it spans the side of the frame but can be opened to allow the animal to be released out of the side of the squeeze chute if desired.

The panel 30 is mounted at its lower end on the floor structure 22 which defines a horizontal pivot axis so that the upper part of the panel 30 can be pivoted around the horizontal axis at the lower edge of the panel actuated by a lever system 41 described in detail hereinafter.

The rear panel includes a tail gate assembly generally indicated at 42 which can be opened and closed by actuation of a lever system generally indicated at 43 the details of which will be described hereinafter.

Figure 2:
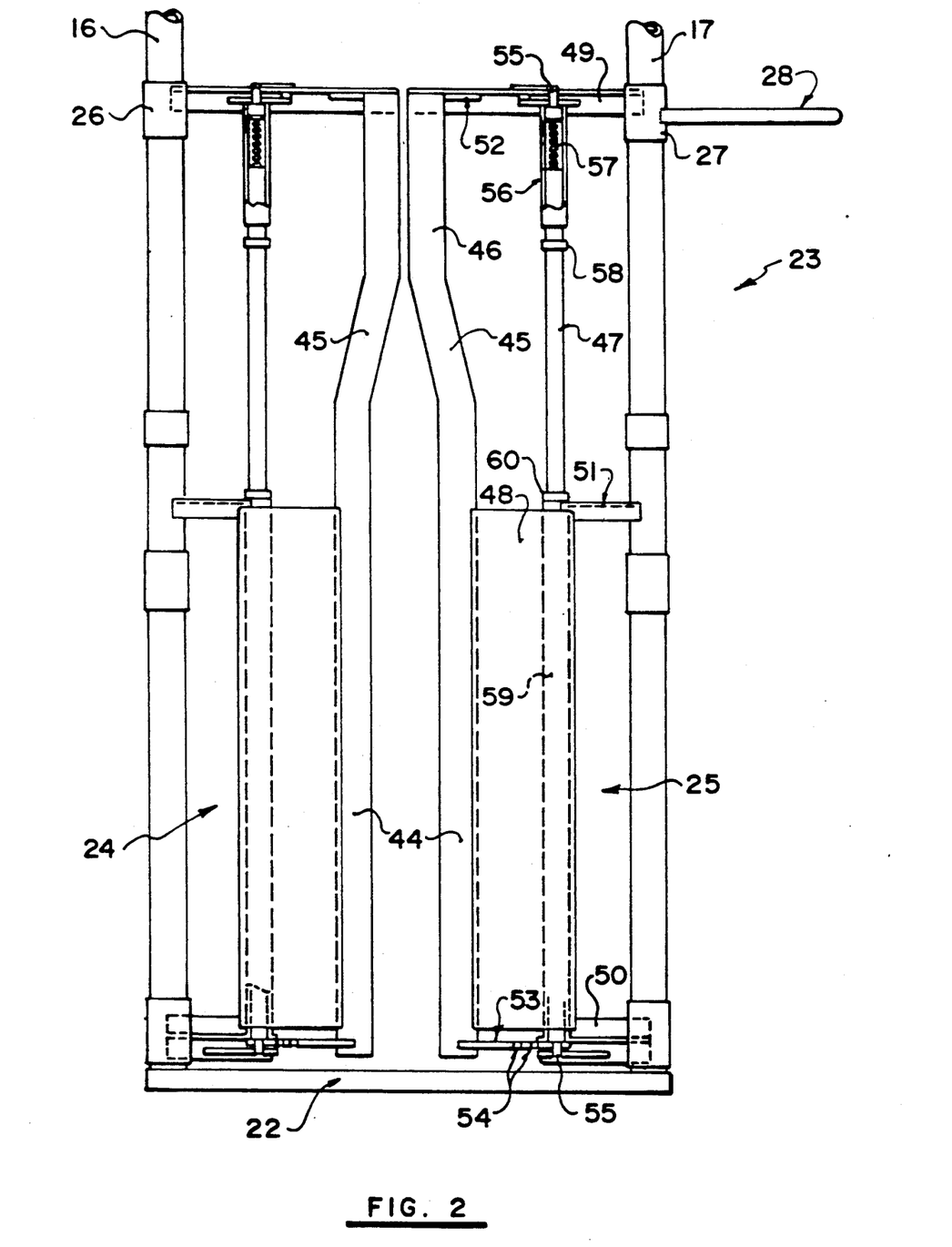
FIG. 2 is a partial front elevational view of the head gate assembly at the front face of the squeeze chute of FIG. 1.

Turning now to FIG. 2, the head gate assembly 23 is shown in more detail and includes the two doors 24 and 25 mounted for pivotal movement on the posts 16 and 17. Each door includes a first vertical post 44 defined by a tubular member which is substantially vertical but includes a crank section 45 so that a lower part of the post in the closed position of the door is spaced to receive the neck of the animal. An upper part of the post indicated at 46 closely approaches the post of the opposite door. Each door further includes a second post 47 generally parallel to the first and positioned between the first and the fixed vertical post 16 or 17 respectively. A guard panel 48 extends between a forward face of the post 44 and a forward face of the post 47 so as to more effectively provide an enclosure to prevent legs becoming caught while an unruly animal is confined.

The horizontal members of the door are provided by an upper channel member 49 and a lower channel member 50 each of which is coupled to a rotatable sleeve or bushing provided on the post 16 or 17 and extends therefrom the upper or lower part respectively of the door. The channel member 49, 50 defines a base and two side flanges with the open face of the channel facing inwardly toward the door that is the open face of the channel 49 faces downwardly and the open face of the channel 50 faces upwardly. In addition a central coupling 51 extends approximately halfway up the post 47 to stabilize the post 47.

The post 44 is mounted upon an upper plate member 52 and a lower plate member 53 each of which projects therefrom at right angles so as to slide into and along the respective channel member 49, 50. The cooperation between the plate member 52, 53 and the channel member 49, 50 maintains the post 44 in the same plane as the remainder of the door but allows the post 44 to slide toward and away from the pivot axis of the door so as to increase and decrease the width of the door and thus to increase and decrease the spacing between the posts 44 in the closed position to accomodate different size animals.

The plate members 52 and 53 include a plurality of holes 54 arranged longitudinally of the respective plate member. A pin 55 can project into a respective one of the holes 54 so as to locate the plate memer 52, 53 at the required position of the post 44 thus latching the post at adjustable positions as required by the user. The upper pin 55 is mounted upon a sleeve 56 slidable longitudinally of the main part of the post 47. The sleeve 56 is biased by a spring 57 upwardly so as to press the pin 55 into the latched position. A collar 58 limits the downward movement of the sleeve 56 along the outside of the post 47. The post 47 terminates at a position spaced downwardly from the top of the sleeve 56 to allow the sliding movement so the sleeve 56 and the post 47 cooperate to define the complete length of the post.

The lower pin 55 is mounted upon a lower end of the post 47. The post 47 at its lower part is slidable within a sleeve 59 which extends from the top of the plate 48 downwardly to the bottom channel 50. The sring 57 thus acts to bias the post 47 downwardly within the sleeve 59 to maintain the lower pin 55 in the respective one of the holes 54 to latch the post 44 in position. When it is desired to adjust the position of the post 44, the upper part of the post can be adjusted by manually grasping the sleeve 56 and pulling it downwardly until it engages the collar 58. At this time the upper pin 55 is released from the plate member 52 allowing the plate member to be slid sideways by manual force applied to the post 44. The sleeve 56 is then released so that the pin 55 returns to its position within one of the holes 54. The post 47 is then grasped and lifted upwardly to slide along the sleeve 59 to release the pin 55 from the bottom plate member 53. This allows the lower part of the post to slide to the required location following which the post 47 is released so the spring bias forces the pin 55 back into the respective opening 54. A further collar 60 locates the lower most position of the post 47 within the sleeve 59 with the collar 60 again being attached to the post similar to the collar 58.

The adjustment of the post 44 can therefore be readily obtained simply by manually grasping the adjacent post and physically moving that post as required to enable simple ready adjustment of the post 44 to accomodate different size animals. This simple adjustment overcomes the reluctance of the user to operate the adjustment when this is a more complex and difficult procedure so that the adjustment can be carried out more effectively to suit the size of the animal without danger of hurting the animal or providing an improper confinement which can be dangerous both for the animal and the user.

Figure 3:
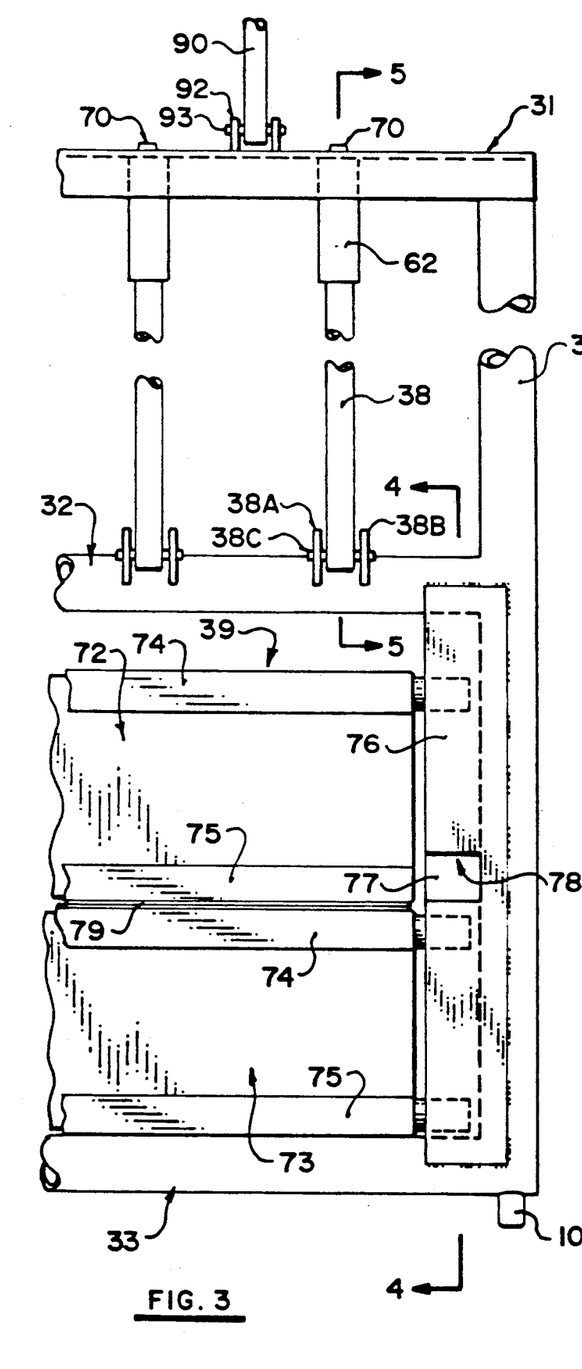
FIG. 3 is a partial elevational view of the squeeze side panel of the squeeze chute of FIG. 1.
Figure 4:
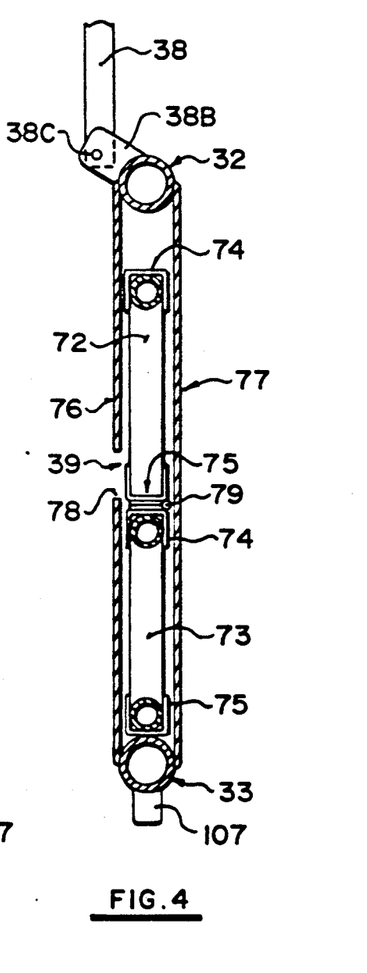
FIG. 4 is a cross-sectional view along the lines 4—4 of FIG. 3.
Figure 5:
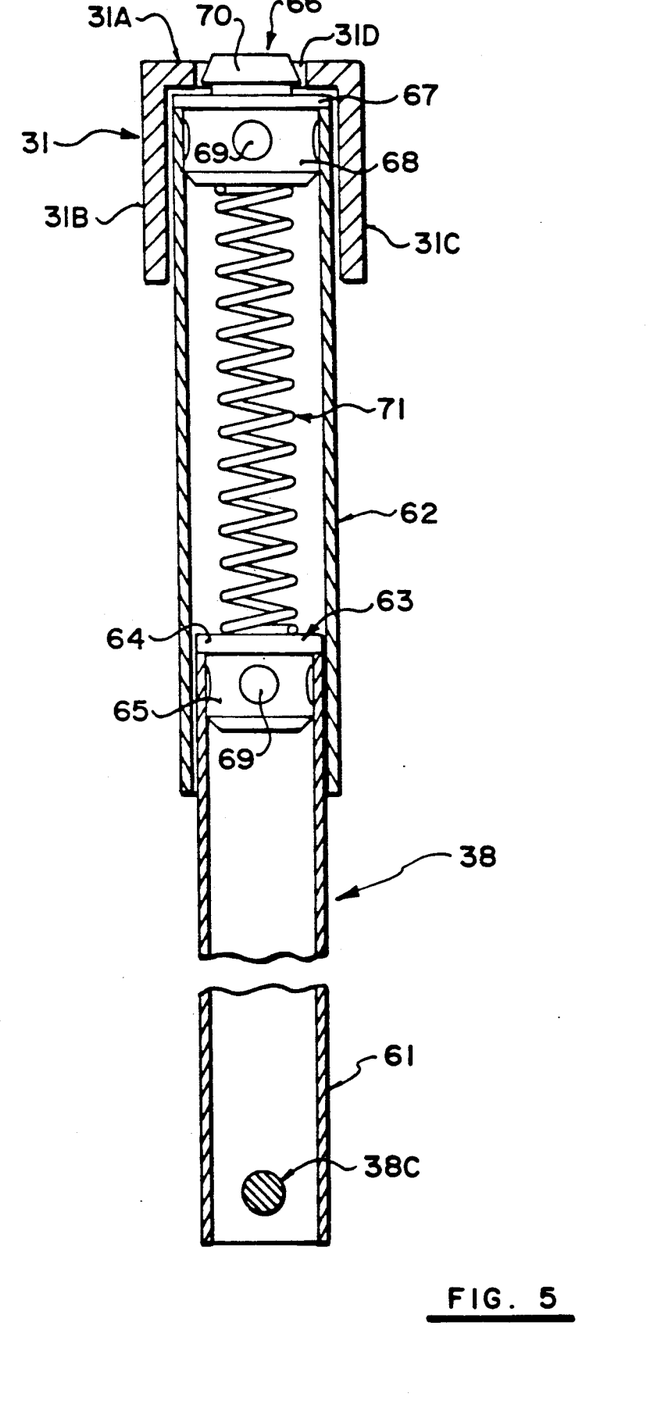
FIG. 5 is a cross-sectional view along the lines 5—5 of FIG. 3 on an enlarged scale.

Turning now to FIGS. 3, 4 and 5, more detail is shown of the construction of the side panels and particularly the drop bars 38 and the drop boards 39.

As shown best in FIG. 4, the lower rail 33, the middle rail 32 and the sides posts 34 and 35 are all formed from tubing preferably of circular cross section. The upper rail 31 as best shown in FIG. 5 is formed as a channel with a base of the channel 31A facing upwardly and two sides 31B and 31C of the channel projecting downwardly leaving a space therebetween or open face of the channel which projects downwardly toward the middle rail 32.

Each of the drop tubes 38 is pivotally supported by a pair of lugs 38A and 38B welded to the upper face of the middle rail 32 and receiving a lower end of the bar 38 therebetween for pivotal movement about a pin 38C. Each bar can therefore pivot about a horizontal axis parallel to the middle rail 32.

As best shown in FIG. 5, each bar 38 includes a lower tubular member 61 of square cross section and an upper cap portion 62 also of square cross section but forms a sleeve to allow sliding of the cap portion 62 along the upper part of the bar 61. In the open upper end of the bar 61 is provided a plug 63 with a head 64 projecting outwardly slightly beyond the outer face of the bar to act as a bearing surface and a plug body 65 extending into the interior as a friction fit so that it is retained in place by the friction connection between the plug and the tube or bar 61. A similar plug 66 is provided in the end of the cap portion 62 so that the plug 66 includes a head 67 and a plug portion 68 projecting into the interior of the cap portion 62. Each of the plugs can be retained in place by projections 69 on the exterior of the plug portion. The plug 66 includes an upwardly projecting lug 70 for extending into an opening 31D in the web 31A of the upper rail 31 as shown in FIG. 3, each drop bar therefore has its own opening in the upper rail 31 so that its upper end is properly located within the channel 31 and is prevented from side to side movement by the cooperation between the lug 70 and the hole. The drop bar 38 can be removed from its fixed position within the channel 31 by grasping the cap portion 62 manually and pulling it downwardly against the bias of a spring 71 extending between the underside of the plug member 66 and the cap 64 of the plug 63. The spring 71 is thus compressed until the lug 70 is released from the side flange 31C of the channel allowing the drop bar to be pulled forwardly and lowered to vertical position alongside the drop boards 39.

The drop boards 39 comprise a pair of boards 72 and 73 each of which includes an upper rail 74 and a lower rail 75 interconnected by a wooden panel closing the space between the upper and lower rails. The rails are formed from tubing of square cross section. The end of the upper rail 74 of the upper board 72 extend beyond the end of the board into a channel formed on the inwardly facing side of the end rail 34 by two flanges 76 and 77 welded in parallel spaced relation. Only one end is shown in FIG. 3 but it will be apparent that the other end is identical. The end of the rail 74 is swaged outwardly into a cylindrical portion of outside diameter similar to the inside spacing between the flanges 76 and 77 to allow a simple sliding action of the end of the rail 74 within the channel. Similarly the end of the upper rail 74 of the board 73 is formed into a swaged end for sliding action. In addition the ends of the lower rail 75 of the lower board 73 are formed into a swaged end for the sliding action. The ends of the lower rail 75 of the upper board 72 however terminate at the end of the board. An opening 78 is formed in the flange 76 of sufficient size to allow the ends of the rails projecting into the channel to escape from the channel. The lower rail 75 of the upper board 72 is coupled to the upper rail 74 of the lower board 73 by a hinge 79 positioned at the rear of the boards and allowing the centre rails thus to pivot forwardly to fold the boards into parallel overlying position as required.

The height of the upper rail 74 of the upper board 72 is positioned just below the top of the channel defined by the flanges 76 and 77 so that the boards can be grasped by suitable handles (not shown) and lifted to a position in which the upper rail 74 of the lower board 73 is aligned with the opening 78 in the channel thus allowing the rail 74 to be pulled out of the opening so that the boards can be folded downwardly into a folded flattened position lying across the floor with the upper board 72 parallel to and top of the lower board 73. If required the upper rail 74 of the upper board can be pulled out of the opening 78 as it folds downwardly and then the lower rail 75 of the lower board pulled upwardly and outwardly of the opening to remove the boards altogether.

The mounting of the boards including the channels and swaged ends provides a simple mounting technique which is inexpensive to manufacture and allows the boards to be readily removed or folded as required.

Figure 6:
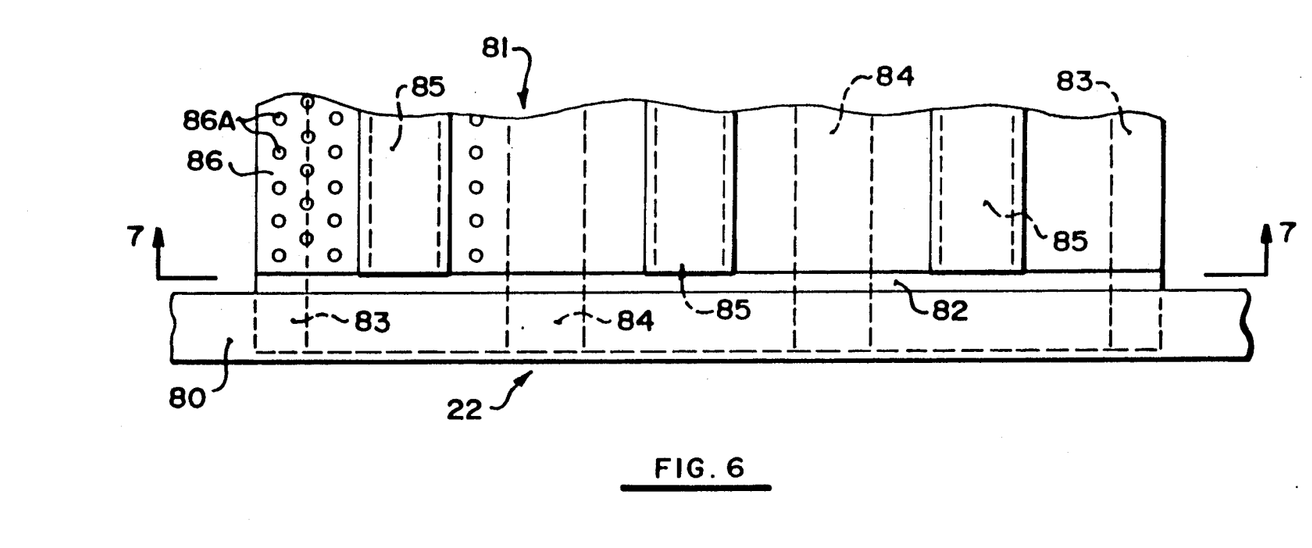
FIG. 6 is a top plan view of one portion of the floor of the squeeze chute of FIG. 1.
Figure 7:
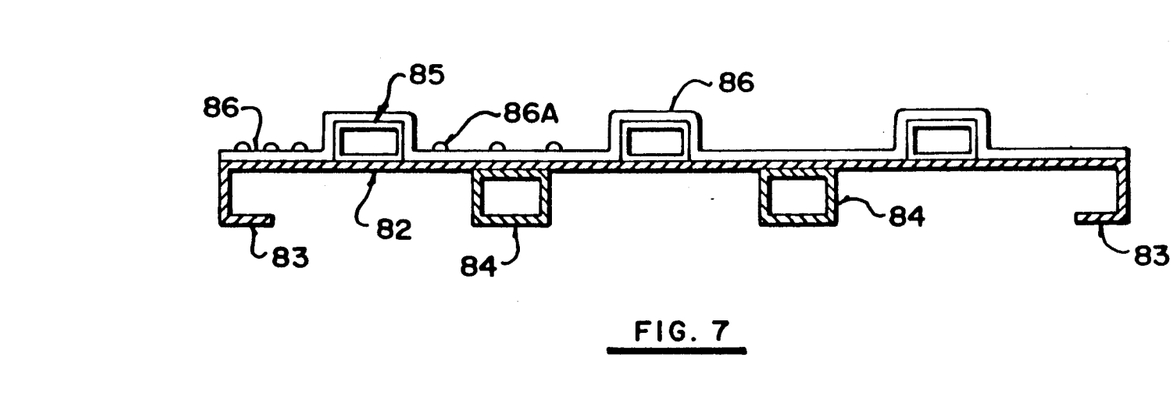
FIG. 7 is a cross-sectional view along the lines 7—7 of FIG. 6.

Turning now the FIGS. 6 and 7, the floor structure 22 is shown in more detail and comprises a pair of channels one of which is shown at 80 and the other of which is parallel to the channel shown along the opposed side of the floor. The channel includes a base which is vertical and two flanges which lie horizontal one forming a bottom ledge for receiving a floor panel 81 and the other across the top of the floor panel. The cross section of the floor panel is shown in more detail in FIG. 7 and comprises a sheet 82 of galvanized steel the front and rear edges of which are turned downwardly and inwardly as indicated at 83 to form a flange section for supporting the sheet. On the underside of the sheet is welded a pair of stiffeners 84 in the form of rectangular tubular members which extend across the full width of the sheet that is the same length as the flanges 83. The flanges 83 and the stiffeners 84 thus rest upon the lower flange of the channel 80 as best shown in FIG. 6.

On top of the sheet 82 is welded three further stiffener members 85 which are offset relative to the stiffeners 84 but lie parallel thereto. The stiffeners 85 terminate at a position inwardly of the flanges of the channel 80 as best shown in FIG. 6.

On top of the sheet and the stiffeners 85 is cast in place a layer 86 of a resilient wear resistant material such as rubber or other polymer with a suitable patterning of the upper surface of the rubber layer to allow gripping by the feet of the animals. The cast rubber layer is applied also over the stiffeners 85 so that the stiffeners form ribs in the cast layer which is thinner than the stiffeners again allowing a gripping action by the feet of the animal.

The use of the stiffeners thus reduces the thickness requirement for the sheet 82 and for the resilient layer and thus the cost of the relatively expensive galvanized and rubber materials. In addition the upper stiffeners provide ribs across the floor which give an effective gripping action for the feet of the animal so that it can push rearwardly against the sides of the stiffeners when it is attempting to escape from the chute without the danger of its feet slipping and causing it to fall. The upper surface of the rubber between the stiffeners or ribs includes hemispherical bumps 86A of approximately ⅜ inch diameter spread equidistantly across the surface. These also improve the gripping action. A choice of approximately 80 grommet hardness gives a good gripping action.

Figure 8:
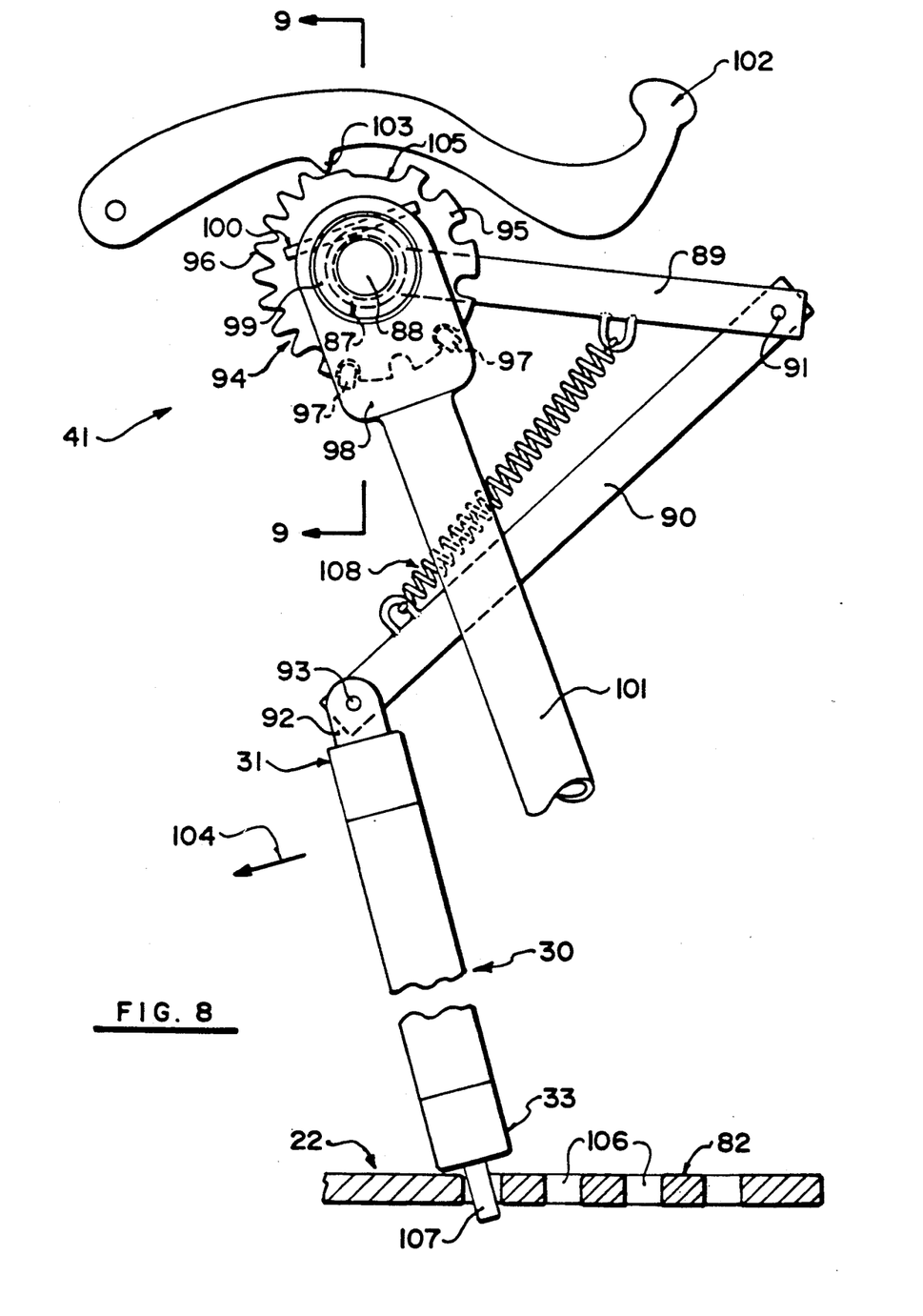
FIG. 8 is an elevational view from the front of the squeeze chute showing the details of the actuating mechanism for pivotal movement of the squeeze side panel of the squeeze chute of FIG. 1.
Figure 9:
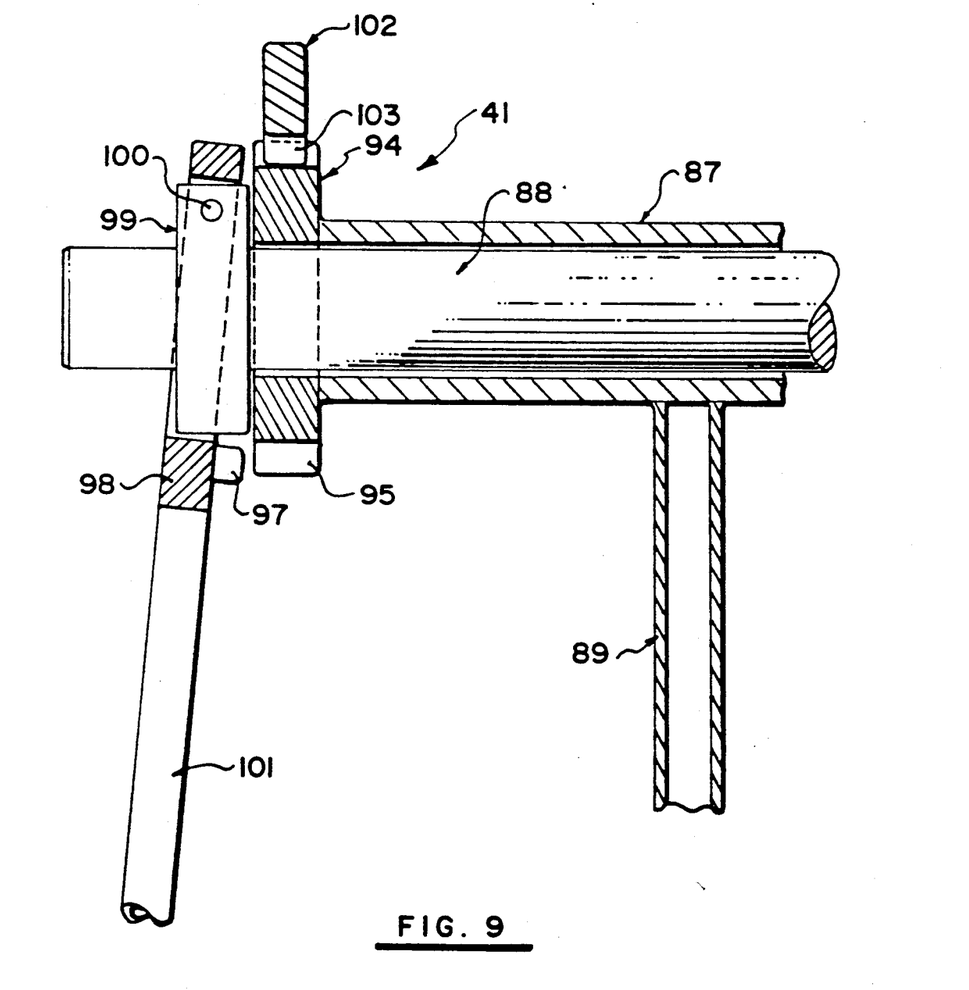
FIG. 9 is a cross-sectional view along the lines 9—9 of FIG. 8.

Turning now to FIGS. 8 and 9, the actuating mechanism for the side panel 30 of the squeeze chute is shown in more detail. The mechanism is generally indicated at 41 as shown in FIG. 1. The mechanism includes an actuating tube 87 which is mounted upon a shaft 88 for rotational movement around the shaft. The shaft is coupled to the front post 17 and to the rear post 19 so that the tube 87 extends in a horizontal orientation at a position above the top rail 31 of the squeeze side panel 30. The tube 87 carries a pair of levers 89 projecting outwardly to one side of the tube generally at right angles thereto. The levers 89 are rotated around the axis of the shaft 88 by rotation of the tube 87. Between the end of the levers 89 and the upper rail 31 is provided a coupling link 90 which is pivotally connected to the lever 89 by a pin 91 and to the rail 31 by a lug 92 and a pin 93.

Rotation of the tube 87 is provided by the driving action of a gear 94 welded to the front end of the tube 87. The gear 94 includes a plurality of gear teeth 95 and ratchet teeth 96 arranged around the periphery of the gear wheel and covering approximately 180° of arc.

The gear teeth 95 cooperate with pins 97 carried on an actuating member 98 which can rotate around the shaft 88 on a boss 99. The actuating member 98 is coupled to the boss 99 so that it rotates around the axis therewith but can pivot relative thereto on a pin 100 offset to one side of the axis of the shaft 88 so that the pins 97 can move from a free position shown in FIG. 9 in a counterclockwise direction so that the pins engage axially into the spaces between the teeth 95 of the gear wheel. A suitable spring biasing system (not shown) can be used to bias the actuating member 98 into the release position shown in FIG. 9 if required.

Rotation of the gear wheel 94 can therefore be obtained by manually grasping a handle 101 of the actuating member at the forward end of the squeeze chute, moving the actuating member about the pin 100 to engage the pins 97 into the gear teeth and then by manually rotating the handle in the required direction. The angular position of the handle can be adjusted by moving the handle and the actuating member to the release position, rotating the handle around the shaft 88 to a required position and then moving the pins 97 into the engagement position to actuate rotation of the gear wheel.

The ratchet teeth 96 cooperate with a ratchet member 102 mounted on the frame at a position (not shown) and self weighted onto the ratchet teeth. As best shown in FIG. 8, therefore, rotation of the gear wheel 94 in a clockwise direction causes the teeth 96 to move in the clockwise direction into engagement with a tooth 103 of the ratchet member 102 so as to be held at the angular position to which the gear wheel reaches as rotated by the handle 101. This rotation of the gear wheel forces the lever 89 in the clockwise direction which pushes the rail 31 inwardly in a direction of the arrow 104.

The ratchet teeth 96 cooperate with the ratchet tooth 103 on the member 102 to hold the squeeze panel in the position to which it is moved by the manual actuation of the handles 101 thus squeezing the animal and holding the animal in the squeezed condition until the ratchet arrangement is released by lifting of the member 102 by the handle on the outer end thereof.

As indicated at 105, the gear wheel 94 is free from teeth for a short part of its periphery. This part allows the gear wheel to be moved in a counterclockwise direction under actuation by the lever 101 without any effect from the ratchet member 102. As noted from the angular position of the lever arm 89, as the gear wheel is moved in the counterclockwise direction, this pulls the squeeze panel to its outermost position and then further movement in the counterclockwise direction acts to lift the squeeze panel 30 away from the floor 22. As shown in the bottom part of FIG. 8, the floor 22 includes a plurality of holes 106 acting as locating members for locating the base of the squeeze panel 30 and particularly a pair of pins 107 at the bottom edge of the panel which project into respective ones of the openings 106. Thus the position of the base of the panel 30 can be moved inwardly and outwardly across the floor of the squeeze chute by selecting respective ones of the openings 106 to accomodate larger or smaller animals before the squeezing or pivoting action of the panel 30 takes place.

In operation therefore, the position of the squeeze panel can be adjusted very simply by the operator releasing the ratchet member 102 and this causes the panel 30 to move to its outer most position under spring bias by a spring 108. When in the outermost position, the operator simply moves the lever 101 freely around the shaft 88 to a required position and then lifts the lever 101 in the counterclockwise direction thus causing the panel 30 to be lifted away from the floor. The operator then uses a foot to control the position of the base of the panel to select the required one of the openings 106 following which the lever 101 is released and can again be used in a squeezing action. Immediately without difficulty, therefore, the device can be adjusted to accomodate different size of animals so there is no necessity to sort the animals into larger and smaller sizes prior to their leading into the chute.

Figure 10:
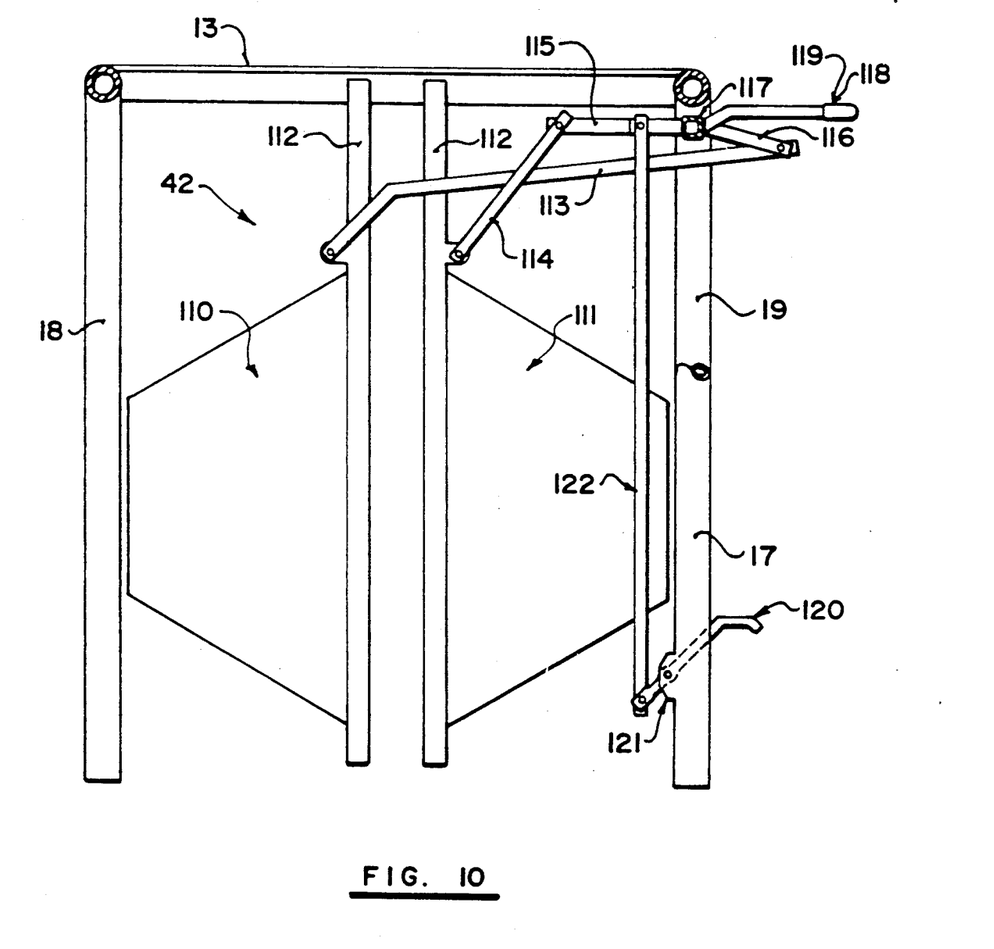
FIG. 10 is a schematic elevational view showing the actuating mechanism for the tail gate assembly of the squeeze chute of FIG. 1

Turning now to FIGS. 1 and 10, the operation and actuating system for the tailgate is shown schematically. Basically the tailgate comprises a pair of reciprocating doors 110 and 111 each of which includes a vertical post 112 which is guided for sliding movement along the upper rear rail 13 in a horizontal direction inwardly and outwardly from the inward closed position shown in FIG. 10 to an outward position (not shown). This operation is obtained by a pair of cranks 113 and 114 which push and pull respectively the posts 112. The cranks 113 and 114 are mounted on opposite ends of a pair of levers 115 and 116 mounted for rotation about a longitudinal axis of a shaft 117. The shaft 117 is mounted suitably on the frame for rotational movement about its longitudinal axis with the shaft 117 extending horizontally from a front post 17 to the rear post 19. The lever 115 thus extends forwardly from the shaft 117 and the lever 116 extends rearwardly and the cranks 113 and 114 are suitably connected pivotally to provide the necessary pushing and pulling action.

The shaft 117 is rotated manually by the operator of the chute. Thus there are provided two manual handles 118 and 119 mounted on the shaft and extending generally horizontally outwardly therefrom to the side of the squeeze chute. Only the handle 118 is visible in FIG. 10 and the handle 119 is hidden by the handle 118 and thus not visible. However in FIG. 1 both handles are visible and it will be seen that one handle is arranged adjacent the front end of the chute and the other handle is adjacent the rear so the operator can operate the tailgate assembly 42 from either end.

In addition to the handles 118 and 119 there is also provided a foot pedal 120 which is pivotally mounted upon a lug 121 on the front vertical post 17. The lower end of the foot pedal extends beyond the pivot lug 121 to a vertical push rod 122 to which it is pivotally coupled. Downward pressure on the foot pedal therefore pushes the rod 122 upwardly and thus rotates the shaft 117 in a clockwise direction as shown thus moving the tailgate assembly to the open position. The operator can return the tailgate to the closed position simply by pushing upwardly on the one of the handles 118 or 119.

The provision therefore of the foot pedal enables the device to be operated simply using the weight of the operator rather than continually pulling and pushing with the arms which can become tiring.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An animal confinement apparatus comprising a generally channel shaped frame structure having a head end for receiving a head of an animal to be confined, two sides each for extending along a respective side of the animal to be confined, a tail end remote from the head end, a head gate assembly at the head end operable to move from a release position to a closed position in which the neck of the animal is grasped for confinement thereof, a squeeze side panel, said panel being operable to move from an initial outward position inwardly toward the opposed side to squeeze the animal to be confined, the squeeze side panel comprising a substantially planar panel having a plurality of horizontal rail members, a plurality of parallel drop bars on one horizontal member so as to extend to an adjacent horizontal rail member, each of the drop bars having one end mounted on said one horizontal rail member for pivotal movement relative thereto from a closed position in which an opposed end is attached to the adjacent horizontal rail member to an open position in which the opposed end is free to be pivoted out of the plane of the panel to expose the confined animal, each drop bar comprising a main bar part extending from said one rail member to a free end adjacent said adjacent rail member, a cap part mounted on the free end and slidable longitudinally thereof relative to the main part and spring means biasing the cap part outwardly from the main part, said adjacent rail member including receptacle means for receiving the cap part and shaped to release the cap part on movement of the cap part against said spring bias.

2. Apparatus according to claim 1 wherein the cap part comprises a tubular metal sleeve with a molded plastic cap on a free end thereof.

3. Apparatus according to claim 2 wherein the main part comprises a metal tube with a plastic cap thereon having a head for sliding on an inner surface of the sleeve, said spring means extending between said cap on said main part and an inner surface of the cap on the sleeve.

4. Apparatus according to claim 1 wherein said adjacent rail member comprises a channel having two vertical side flanges in a horizontal web so that an open slot of the channel faces toward said drop tubes, the web having a plurality of holes therein each for receiving a projecting button member projecting longitudinally outwardly from said cap part.

5. An animal confinement apparatus comprising a generally channel shaped frame structure having a head end, a head gate assembly at the head end operable to move from a release position to a closed position in which the neck of the animal is grasped for confinement thereof, a squeeze side panel, an opposed side panel, said squeeze side panel being operable to move from an initial outward position inwardly toward the opposed side panel to squeeze the animal to be confined, at least one of said side panels comprising substantially planar panel having a plurality of horizontal rail members and a pair of drop boards mounted in co-planar edge to edge relationship between one rail member and the next adjacent rail member, the drop boards being coupled for hinged movement about a hinge line parallel to and between the boards, each of the drop boards having an upper rail and a lower rail, the upper rail of an upper one of the boards, the lower rail of a lower one of the boards and one of the upper rail of the lower board and the lower rail of the upper board each having ends projecting outwardly beyond an end of the drop board, a pair of channel guide members mounted between said one rail member and a next adjacent rail member and each defining a web and two parallel flanges leaving an open channel slot facing inwardly toward the drop boards and arranged to receive and locate the outwardly projecting ends of the rails, one of the flanges of each of the channel guide members having an opening therein shaped to allow release therethrough of the end of a rail, the opening being located at a height above a rest position of the rail when held in the channel guide member whereby the drop boards can be lifted and said end of the rail withdrawn from the channel guide member.

6. Apparatus according to claim 5 wherein each of the rails is of square cross section and the ends thereof are swaged to a substantially circular cross section.

7. Apparatus according to claim 5 wherein the end of each rail can be withdrawn through the opening.

8. An animal confinement apparatus comprising a generally channel shaped frame structure having a head end for receiving a head of an animal to be confined, two sides each for extending along a respective side of the animal to be confined, a tail end remote from the head end and a floor on which the animal to be confined stands and spanning the area between the sides, the head end and the tail end, a head gate assembly at the head end operable to move from a release position to a closed position in which the neck of the animal is grasped for confinement thereof, a squeeze side panel, actuating means operable to move the squeeze side panel from an initial outward position inwardly toward the opposed side to squeeze the animal to be confined, the squeeze side panel comprising a substantially planar panel having a plurality of horizontal rail members, the panel having a lower edge adjacent the floor, locating means defining a plurality of locations for the lower edge at spaced positions toward and away from the animal to accomodate smaller and larger animals respectively, said actuating means being arranged to pivot said panel about said lower edge while in one of said locations to squeeze said animal, said actuating means comprising lever means coupled to said panel at a location thereon spaced from the lower edge, a manually operable lever arranged to apply force to said lever means in a first direction to cause said pivoting about said panel about said lower edge, and to apply force in a second direction opposite to the first direction to lift the panel upwardly from the locating means to allow movement of the lower edge of the panel from one of said locations to another of said locations.

9. Apparatus according to claim 8 wherein said lever means comprises first and second lever means spaced longitudinally of the panel attached to an elongate actuating member parallel to the lower edge of the panel, said manually operable lever being arranged to rotate said elongate member about a longitudinal exis thereof.

10. Apparatus according to claim 9 wherein said manually operable lever is freely rotatable about said elongate member, said elongate member having a drive gear mounted thereon for rotation therewith about the axis thereof, the drive gear having teeth thereon releasably engagable by the manually operable lever to rotate the elongate member about the axis thereof.

11. Apparatus according to claim 10 including releasable ratchet means engagable with said drive gear to hold said panel in a squeeze position thereof.

12. Apparatus according to claim 11 including means disabling said ratchet means to allow rotation of the elongate member in an opposed direction for causing movement of said lever means in said second direction to lift the panel upwardly.

13. Apparatus according to claim 10 wherein said manually operable lever is movable axially in a first direction to cause engagement thereof with said drive gear and in an opposed direction thereof to cause release from said drive gear.

14. An animal confinement apparatus comprising a generally channel shaped frame structure having a head end for receiving a head of an animal to be confined, two sides each for extending along a respective side of the animal to be confined, a tail end remote from the head end and a floor on which the animal to be confined stands, a head gate assembly at the head end operable to move from a release position to a closed position in which the neck of the animal is grasped for confinement thereof, a squeeze side panel, actuating means operable to move the squeeze side panel from an initial outward position inwardly toward the opposed side to squeeze the animal to be confined, the squeeze side panel comprising a substantially planar panel having a plurality of horizontal rail members, the floor comprising a substantially imperforate metal sheet defining an upper surface spanning an area defined between the sides and extending from the head end to the tail end and an elastically compressible coating applied over substantially the whole area of the upper surface of the sheet.

15. Apparatus according to claim 14 wherein the elastically compressible coating is formed from rubber which is cast in place.

16. Apparatus according to claim 14 wherein there is provided a plurality of stiffener members attached to the metal sheet and extending thereacross from a position adjacent said squeeze side panel to a position adjacent said opposed side, at least some of the stiffener members being mounted on an upper surface of the sheet so as to project upwardly therefrom the coating being applied also over the stiffener members and wherein an upper surface of the elastically compressible coating is molded to form a plurality of raised molded bumps between said ribs.

17. Apparatus according to claim 14 wherein there is provided a plurality of stiffener members attached to the metal sheet and extending thereacross from a position adjacent said squeeze side panel to a position adjacent said opposed side, at least some of the stiffener members being mounted on an upper surface of the sheet so as to project upwardly therefrom the coating being applied also over the stiffener members.

18. An animal confinement apparatus comprising a generally channel shaped frame structure having a head end for receiving a head of an animal to be confined, two sides each for extending along a respective side of the animal to be confined, a tail end remote from the head end, a head gate assembly at the head end operable to move from a release position to a closed position in which the neck of the animal is grasped for confinement thereof, a squeeze side panel, said panel being operable to move from an initial outward position inwardly toward the opposed side to squeeze the animal to be confined, the head gate assembly comprising a pair of head gate doors, each door having a first vertical post member for cooperating with the first vertical post member of the other of the doors to trap the neck of the animal therebetween, support means mounting the first vertical post member on a hinge support member for pivotal movement of the door and particularly the first vertical post member about a respective pivot axis generally parallel to the first vertical post member and located at a respective one of said sides such that the doors can move from a closed position in which the first vertical post members lie in a plane including the pivot axes to open positions on either side of the plane, and adjustment means mounting the post member on the support means for movement relative to the support means in a direction toward and away from the pivot axis to adjust the space between the first vertical post members in the closed position to accommodate different width necks of the animals, said adjustment means comprising first and second guide means at a top and bottom respectively of the door, a first and a second adjustment plate attached at a top and bottom respective of the first vertical post member, each of said adjustment plates being sideable toward and away from the respective pivot axis along a respective one of the guide means and including a plurality of spaced adjustment locations thereon, and first and second latch means mounted respectively adjacent the first and second guide means and movable vertically to engage and release the respective adjustment plate at a selected one of the adjustment locations thereon.

19. Apparatus according to claim 18 wherein each door includes a second vertical post member parallel to the first vertical pivot member and located between the first vertical post member and the respective pivot axis, the first and second latch means being mounted on the second vertical post member.

20. Apparatus according to claim 19 wherein the the second vertical post member includes a first coaxial portion mounted at an upper end thereof slidable therealong longitudinally of the axis thereof and a second coaxial portion mounted at a lower end thereof slideable therelong longitudinally of the axis thereof, the first portion carrying at an upper end thereof a pin defining the first latch means and the second portion carrying at a lower end thereof a pin defining the second latch means, each pin being arranged to cooperate with a respective recess in the respective adjustment plates.

21. An animal confinement apparatus comprising a generally channel shaped frame structure having a head end for receiving a head of an animal to be confined, two sides each for extending along a respective side of the animal to be confined, a tail end remote from the head end, a head gate assembly at the head end operable to move from a release position to a closed position in which the neck of the animal is grasped for confinement thereof, a squeeze side panel, said panel being operable to move from an initial outward position inwardly toward the opposed side to squeeze the animal to be confined, a tail gate assembly, means for moving the tail gate assembly from an open position allowing an animal to pass forwardly into the frame structure for confinement to a closed position rearwardly of the confined animal, and manual actuating means for operating said moving means, said actuating means including a handle which can be pulled and pushed by hand and a foot pedal which can be pressed by the foot of the user.

22. Apparatus acording to claim 21 including a shaft extending from a front end of the frame to the rear end along one side of the frame, the shaft being rotatable about a longitudinal axis to cause said operation, the shaft including a first handle at the front end, a second handle at the rear end and the foot pedal at the front end connected by a link member to the shaft.

23. Apparatus according to claim 21 wherein depression of the foot pedal causes opening of the tail gate assembly and pushing of the handle causes return of the tail gate assembly to the closed position.

* * * * *